US008751500B2

(12) United States Patent
Duarte et al.

(10) Patent No.: US 8,751,500 B2
(45) Date of Patent: Jun. 10, 2014

(54) NOTIFICATION CLASSIFICATION AND DISPLAY

(71) Applicant: Google Inc., Mountain View, CA (US)

(72) Inventors: Matias Gonzalo Duarte, Mountain View, CA (US); Daniel Marc Gatan Shiplacoff, Los Altos, CA (US); Marco Paglia, San Francisco, CA (US); Alexander Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/763,327

(22) Filed: Feb. 8, 2013

(65) Prior Publication Data
US 2013/0346408 A1 Dec. 26, 2013

Related U.S. Application Data

(60) Provisional application No. 61/664,730, filed on Jun. 26, 2012, provisional application No. 61/714,613, filed on Oct. 16, 2012.

(51) Int. Cl.
*G06F 17/30* (2006.01)

(52) U.S. Cl.
USPC .......................................................... 707/737

(58) Field of Classification Search
USPC .......................................................... 707/737
See application file for complete search history.

(56) References Cited

U.S. PATENT DOCUMENTS

| 5,828,882 | A | 10/1998 | Hinckley |
| 6,631,363 | B1 | 10/2003 | Brown et al. |
| 7,003,525 | B1 | 2/2006 | Horvitz et al. |
| 7,127,394 | B2 | 10/2006 | Strong |
| 7,137,099 | B2 | 11/2006 | Knight et al. |
| 7,139,718 | B2 | 11/2006 | Jeyachandran et al. |

(Continued)

FOREIGN PATENT DOCUMENTS

| EP | 1 287 444 B1 | 7/2007 |
| KR | 20100126718 A | 12/2010 |

OTHER PUBLICATIONS

Conder et al., Android Fundamentals Status Bar Notifications, May 9, 2011, accessed May 2, 2013 at http://mobile.tutsplus.com/tutorials/android/android-fundamentals-status-bar-notifications/.*

(Continued)

*Primary Examiner* — Jeff A Burke
*Assistant Examiner* — William Spieler
(74) *Attorney, Agent, or Firm* — Shumaker & Sieffert, P.A.

(57) ABSTRACT

A method can include receiving, by a notification module operable by a computing device, an instruction to generate a contextual notification and notification information associated with the instruction. The method also cam include generating, by the notification module and in response to receiving the instruction, a notification object. In some examples, the method can include assigning, by the notification module and based on the notification information, the notification object to at least one notification class from a plurality of notification classes. The example method can also include generating, by the computing device and based at least in part on the at least one notification class to which the notification object is assigned, the contextual notification by populating the notification object with the notification information; and outputting the contextual notification in a manner based at least in part on the at least one notification class.

20 Claims, 7 Drawing Sheets

(56) References Cited

U.S. PATENT DOCUMENTS

| | | | |
|---|---|---|---|
| 7,155,729 B1 | 12/2006 | Andrew et al. | |
| 7,194,681 B1 | 3/2007 | Horvitz | |
| 7,243,130 B2 | 7/2007 | Horvitz et al. | |
| 7,343,365 B2 | 3/2008 | Farnham et al. | |
| 7,457,879 B2 | 11/2008 | Horvitz et al. | |
| 7,565,403 B2 | 7/2009 | Horvitz et al. | |
| 7,743,340 B2 | 6/2010 | Horvitz et al. | |
| 7,797,306 B1 | 9/2010 | Pather et al. | |
| 7,814,055 B2 | 10/2010 | Hullot et al. | |
| 7,844,666 B2 | 11/2010 | Horvitz et al. | |
| 7,975,015 B2 | 7/2011 | Horvitz et al. | |
| 8,024,415 B2 | 9/2011 | Horvitz et al. | |
| 8,082,292 B2 | 12/2011 | Karmakar et al. | |
| 8,086,672 B2 | 12/2011 | Horvitz | |
| 8,166,392 B2 | 4/2012 | Horvitz | |
| 8,332,540 B2 | 12/2012 | Grigsby et al. | |
| 8,347,021 B1 | 1/2013 | Phillips et al. | |
| 8,364,467 B1 | 1/2013 | Bowman et al. | |
| 8,549,441 B2 | 10/2013 | Waldman et al. | |
| 2002/0039070 A1 | 4/2002 | Ververs et al. | |
| 2002/0054117 A1 | 5/2002 | Van Dantzich et al. | |
| 2002/0087649 A1* | 7/2002 | Horvitz | 709/207 |
| 2002/0198946 A1 | 12/2002 | Wang et al. | |
| 2003/0046421 A1 | 3/2003 | Horvitz et al. | |
| 2003/0097485 A1* | 5/2003 | Horvitz et al. | 709/313 |
| 2003/0101190 A1* | 5/2003 | Horvitz et al. | 707/100 |
| 2003/0131073 A1* | 7/2003 | Lucovsky et al. | 709/219 |
| 2003/0212646 A1 | 11/2003 | Horvitz | |
| 2004/0037271 A1* | 2/2004 | Liscano et al. | 370/352 |
| 2004/0061716 A1 | 4/2004 | Cheung et al. | |
| 2004/0128359 A1 | 7/2004 | Horvitz et al. | |
| 2004/0177053 A1 | 9/2004 | Donoho et al. | |
| 2004/0205142 A1 | 10/2004 | Bahr | |
| 2004/0225718 A1 | 11/2004 | Heinzel et al. | |
| 2005/0091269 A1 | 4/2005 | Gerber et al. | |
| 2005/0132016 A1 | 6/2005 | Boone | |
| 2005/0136903 A1 | 6/2005 | Kashima et al. | |
| 2005/0248437 A1 | 11/2005 | Hellebust et al. | |
| 2006/0025159 A1 | 2/2006 | Estevez et al. | |
| 2006/0129947 A1 | 6/2006 | Hamzy et al. | |
| 2006/0259537 A1 | 11/2006 | Emberton et al. | |
| 2007/0174768 A1 | 7/2007 | Sen et al. | |
| 2007/0214228 A1 | 9/2007 | Horvitz et al. | |
| 2007/0214429 A1 | 9/2007 | Lyudovyk et al. | |
| 2007/0288932 A1 | 12/2007 | Horvitz et al. | |
| 2008/0046399 A1 | 2/2008 | Goodman et al. | |
| 2008/0198005 A1 | 8/2008 | Schulak et al. | |
| 2009/0054040 A1 | 2/2009 | Van Wijk et al. | |
| 2009/0276700 A1 | 11/2009 | Anderson et al. | |
| 2010/0058231 A1 | 3/2010 | Duarte et al. | |
| 2010/0082693 A1 | 4/2010 | Hugg et al. | |
| 2010/0228714 A1 | 9/2010 | Carroll | |
| 2011/0161987 A1 | 6/2011 | Huang et al. | |
| 2011/0194676 A1 | 8/2011 | Hogan et al. | |
| 2011/0270869 A1 | 11/2011 | Waldron et al. | |
| 2012/0072991 A1 | 3/2012 | Belani et al. | |
| 2012/0077521 A1 | 3/2012 | Boldyrev et al. | |
| 2012/0078882 A1 | 3/2012 | Boldyrev et al. | |
| 2012/0084707 A1 | 4/2012 | Abdel-Kader et al. | |
| 2012/0089681 A1 | 4/2012 | Chowdhury et al. | |
| 2012/0151383 A1 | 6/2012 | Kazan et al. | |
| 2012/0166277 A1 | 6/2012 | Gnanamani et al. | |
| 2012/0166284 A1 | 6/2012 | Tseng | |
| 2012/0166433 A1 | 6/2012 | Tseng | |
| 2012/0166452 A1 | 6/2012 | Tseng | |
| 2012/0166530 A1 | 6/2012 | Tseng | |
| 2012/0198002 A1 | 8/2012 | Goulart et al. | |
| 2012/0246246 A1 | 9/2012 | Moore | |
| 2012/0295645 A1 | 11/2012 | Yariv et al. | |
| 2012/0304116 A1 | 11/2012 | Donahue et al. | |
| 2012/0304118 A1 | 11/2012 | Donahue et al. | |
| 2012/0323933 A1 | 12/2012 | He et al. | |
| 2013/0038437 A1 | 2/2013 | Talati et al. | |
| 2013/0040610 A1 | 2/2013 | Migicovsky et al. | |
| 2013/0130777 A1 | 5/2013 | Lemay et al. | |
| 2013/0132896 A1 | 5/2013 | Lee et al. | |

OTHER PUBLICATIONS

McCrickard et al., A Model for Notification Systems Evaluation—Assessing User Goals for Multitasking Activity, Dec. 2003.*

Whitney, Vibration Examples for Android Phone Development, Mar. 27, 2010, accessed May 2, 2013 at http://android.konreu.com/developer-how-to/vibration-examples-for-android-phone-development/.*

Holste, Android SDK Using Alerts, Toasts and Notifications, Jul. 20, 2010, accessed May 2, 2013 at http://mobile.tutsplus.com/tutorials/android/android-sdk-alert/.*

Iqbal, et al., Effects of intelligent notification management on users and their tasks. In Proceedings of the SIGCHI Conference on Human Factors in Computing Systems, pp. 93-102. 2008.*

"Add or remove a reminder for a message or contact," Retrieved from http://office.microsoft.com/en-us/outlook-help/add-or-remove-a-reminder-for-a-message-or-contact-HP001234154.aspx, accessed on Sep. 24, 2012, 2 pp.

Google Play, "Call Reminder Notes by Finmouse," Retrieved from https://play.google.com/store/apps/details?id=com.finmouse.android.callremindernoteslite&feature=search_result, Aug. 27, 2012, 2 pp.

Finmouse, "Finmouse Mobile," Retrieved from http://www.finmouse.com/, accessed on Sep. 24, 2012, 1 p.

LeFebvre, "Set Up a Location-Based Reminder With Maps, [iOS Tips]," Retrieved from http://www.cultofmac.com/168346/set-up-location-based-reminder-with-maps-ios-tips/, May 23, 2012, 4 pp.

U.S. Appl. No. 13/744,053, filed Jan. 17, 2013.

U.S. Appl. No. 13/670,207, filed Nov. 6, 2012.

International Search Report and Written Opinion for International Application No. PCT/US20131047643, Dated Mar. 31, 2014, 14 pages.

* cited by examiner

NOTIFICATION CLASSIFICATION AND DISPLAY

This application claims the benefit of U.S. Provisional Application No. 61/664,730, entitled, "AGGREGATING AND PRIORITIZING NOTIFICATIONS," and filed on Jun. 26, 2012, and U.S. Provisional Application No. 61/714,613, entitled, "NOTIFICATION CLASSIFICATION AND DISPLAY," and filed on Oct. 16, 2012. The entire contents of U.S. Provisional Application No. 61/664,730 and U.S. Provisional Application No. 61/714,613 are incorporated herein by reference.

BACKGROUND

As smartphones, tablets, and other mobile computing devices become more powerful and more common, applications for these computerized devices are becoming more widely available. Many smartphones and tablet computers are associated with virtual application ("app") stores or markets, and are often provided with several applications offering a basic set of functions (such as a phone, a camera, a web browser, and a navigation application).

As the number of applications utilized on mobile computing devices increases, the functionality provided by these devices may increase as well. Users are able to perform increasingly complex tasks using mobile computing devices, many of which use two or more applications. The manner in which mobile computing devices present information, such as notifications, to the user may improve or hinder the user's ability to perform these tasks.

SUMMARY

In one aspect, the disclosure describes a method that includes receiving, by a notification module operable by a computing device, an instruction to generate a contextual notification and notification information associated with the instruction. In accordance with this aspect, the method also may include generating, by the notification module and in response to receiving the instruction, a notification object. In some examples, the method can include assigning, by the notification module and based on the notification information, the notification object to at least one notification class from a plurality of notification classes, wherein a first notification class from the plurality of notification classes is associated with non-urgent, unrequested, notifications related to a current task that the computing device is performing, wherein a second notification class from the plurality of notification classes is associated with urgent, unrequested notifications, wherein a third notification class from the plurality of notification classes is associated with requested, non-urgent notifications related to the current task, and wherein a fourth notification class from the plurality of notification classes is associated with non-urgent, unrequested notifications that are not related to the current task. The example method can also include generating, by the computing device and based at least in part on the at least one notification class to which the notification object is assigned, the contextual notification by populating the notification object with the notification information; and outputting the contextual notification in a manner based at least in part on the at least one notification class.

In another aspect, disclosure describes a computing device that includes one or more processors and a notification module operable by the one or more processors. In accordance with this example of the disclosure, the notification module can be configured to receive an instruction to generate a contextual notification and notification information associated with the instruction and generate, in response to receiving the instruction, a notification object. The notification module also can be configured to assign, based on the notification information and contextual information associated with at least one of the computing device, a user of the computing device, or a sensor operably coupled to the computing device, the notification object to at least one notification class from a plurality of notification classes, wherein a first notification class from the plurality of notification classes is associated with non-urgent, unrequested, notifications related to a current task that the computing device is performing, wherein a second notification class from the plurality of notification classes is associated with urgent, unrequested notifications, wherein a third notification class from the plurality of notification classes is associated with requested, non-urgent notifications related to the current task, and wherein a fourth notification class from the plurality of notification classes is associated with non-urgent, unrequested notifications that are not related to the current task. The notification module further can be configured to generate, based at least in part on the at least one notification class to which the notification object is assigned, the contextual notification by populating the notification object with the notification information and output the contextual notification in a manner based at least in part on the at least one notification class.

In an additional aspect, the disclosure describes a computer-readable storage medium comprising instructions. The instructions, when executed, configure one or more processors of a computing device to receive an instruction to generate a contextual notification and notification information associated with the instruction and generate, in response to receiving the instruction, a notification object. The instructions, when executed, also can configure the one or more processors to assign, based on the notification information and at least one of information associated with an application module operable by one or more processors of the computing device, information associated with a user of the computing device, or information associated with at least one sensor of the computing device, the notification object to at least one notification class from a plurality of notification classes, wherein a first notification class from the plurality of notification classes is associated with non-urgent, unrequested, notifications related to a current task that the computing device is performing, wherein a second notification class from the plurality of notification classes is associated with urgent, unrequested notifications, wherein a third notification class from the plurality of notification classes is associated with requested, non-urgent notifications related to the current task, and wherein a fourth notification class from the plurality of notification classes is associated with non-urgent, unrequested notifications that are not related to the current task. In some examples, the instructions, when executed, further configure the one or more processors to generate, based at least in part on the at least one notification class to which the notification object is assigned, the contextual notification by populating the notification object with the notification information; and output the contextual notification in a manner based at least in part on the at least one notification class.

The details of one or more examples are set forth in the accompanying drawings and the description below. Other features, objects, and advantages of the disclosure will be apparent from the description and drawings, and from the claims.

DETAILED DESCRIPTION

Figure 1:
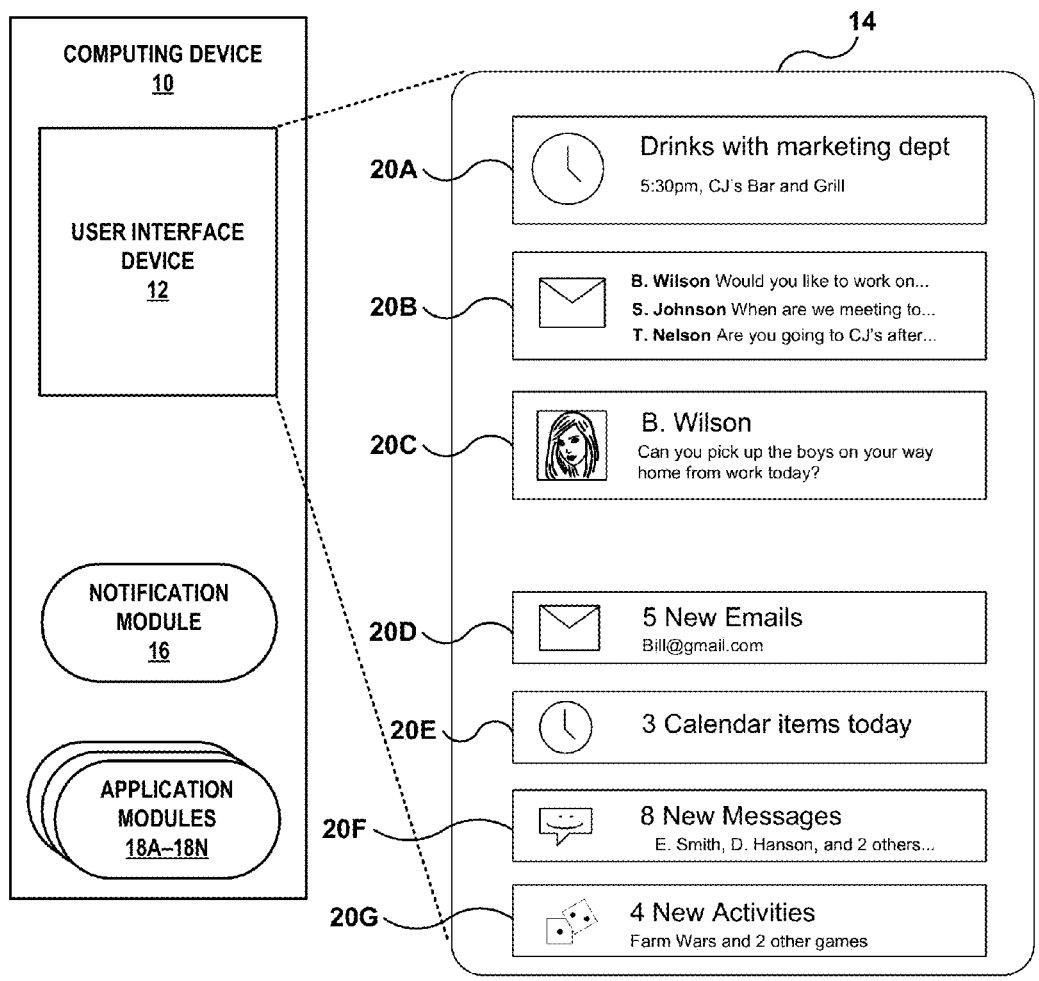
FIG. 1 is a conceptual diagram illustrating an example mobile computing device that is configured to assign a contextual notification into at least one of a plurality of notification classes and output the contextual notification based at least in part on the at least one notification class to which the contextual notification is assigned, in accordance with one or more aspects of the present disclosure.

The disclosure describes examples of a notification manager or notification module operable by at least one processor of a computing device to provide system-wide management of notifications. Mobile computing devices are increasing in complexity and the number of applications installed on the device. Many of these applications can provide instructions to a notification manager to generate a contextual notification, which is configured to generate a contextual notification and cause the contextual notification to be output using a one or more of a speaker, display device, or haptic feedback device operably coupled to the mobile computing device. Applications can use notifications to make a user aware of information associated with the application, such as a received communication (e.g., a telephone call, email, a message, such as a short message service (SMS) or multimedia message service (MMS) message, social networking message, etc.), a calendar event, a game event, information related to another application executed by the mobile computing device, etc. While a notification can be an effective way for the application to alert the user of the computing device of the information, a notification may not always provide the information in a format or at a time that is convenient or useful for the user.

For example, some notification managers may output all notifications in substantially similar formats. Additionally, some notification managers may output each notification as the instruction to generate the notification is received from the application. Moreover, as the number of applications installed on the mobile computing device increases, the number of notifications can also increase. This may result in a situation in which the user of the device can have difficulty managing the number and type of notifications and identifying notifications related to information that is urgent or important compared to information that is less urgent or less important to the user. Together, these issues may reduce a likelihood that the user of the device becomes aware of the information contained in the notification in a context (e.g., time and/or task) that is useful for the user.

In accordance with one or more aspects of the present disclosure, a notification module can provide a contextual notification to a user of the device based on data associated with the contextual notification and contextual information associated with one or more application stored by the device, the user of the device, or at least one sensor of the device. The notification module may present the contextual notification in one or more of a plurality of formats or user interface contexts, which may the notification module may determine based at least in part on the notification class to which the notification module assigns the notification. In this way, the notification module can output relevant information to the user of the computing device in a context-aware manner. This may increase a chance that the user becomes aware of the information at a time and in a context that is useful to the user. For example, for information that the notification module determines is likely to be useful to completing a task in which the user is engaged using the mobile computing device, the notification module may output the notification in a format and in a user interface context where the user is likely to see the information while completing the task. As another example, for information that the notification module determines is non-urgent and not related to a task in which the user is engaged using the mobile computing device, the notification module may output the notification in a format and in a user interface context that does not interrupt the task the user is performing using the mobile computing device, but which the user is likely to notice, either while performing the task or at a later time.

FIG. 1 is a conceptual diagram illustrating an example computing device 10 that is configured to assign a contextual notification into at least one of a plurality of notification classes and output the contextual notification based at least in part on the at least one notification class to which the contextual notification is assigned, in accordance with one or more aspects of the present disclosure. In the example of FIG. 1, computing device 10 is a mobile phone. However, in other examples, computing device 10 may be a personal digital assistant (PDA), a desktop computer, a laptop computer, a tablet computer, a portable gaming device, a portable media player, a camera, an e-book reader, a watch, or another type of computing device.

As shown in FIG. 1, computing device 10 includes a user interface device (UID) 12. UID 12 of computing device 10 may function as an input device and/or an output device for computing device 10. For example, UID 12 of computing device 10 may include a presence-sensitive display, such as a touchscreen configured to receive tactile user input from a user of computing device 10. UID 12 may receive tactile user input as one or more taps and/or gestures. UID 12 may detect taps or other gestures in response to the user touching or pointing to one or more locations of UID 12 with a finger or a stylus pen. UID 12 may be implemented using various technologies. For example, UID 12 may be implemented using a resistive touchscreen, a surface acoustic wave touchscreen, a capacitive touchscreen, a projective capacitance touchscreen, a pressure sensitive screen, an acoustic pulse recognition touchscreen, or another presence-sensitive display technology.

UID 12 may include any one or more of a liquid crystal display (LCD) dot matrix display, light emitting diode (LED) display, organic light-emitting diode (OLED) display, e-ink, or similar monochrome or color display capable of outputting visible information to the user of computing device 10. UID 12 presents a user interface (e.g., user interface 14), which may be related to functionality provided by computing device 10. For example, UID 12 may present various functions and applications such as an electronic message application, a camera application, a calendar application, a map application, and an Internet browser for accessing and downloading information from the Internet. In another example, UID 12 may present a menu of options related to the function and operation of computing device 10, such as screen brightness and other configurable settings of computing device 10.

Computing device 10 may output to UID 12 one or more graphical user interface (GUI) for display at UID 12. The GUI includes graphical elements displayed at various locations of UID 12. For example, FIG. 1 illustrates a notification center GUI 14 that includes notifications 20A-20G (collectively, "notifications 20") as example graphical elements included as part of notification center GUI 14. Notification center GUI 14 is a GUI that notification module 16 can output for display at UID 12, and at which notification module 16 can output at least some notifications. As described below, in some examples, depending on the notification class to which a notification is assigned, notification module 16 may cause the notification to be output in a different user interface context. Other example GUIs in which notification module 16 can output notifications for display at UID 12 will be described below with reference to FIGS. 3A-3C.

Each of notifications 20 shown in FIG. 1 includes notification information, which can include a brief textual summary of the notification or a portion of the content of the notification, e.g., a beginning portion of the text of a communication. In addition, each of notifications 20 may include an icon or picture representing an application or activity with which the notification is associated (e.g., an application icon or a picture of a person from whom a communication was received).

In the example of FIG. 1, expanded calendar notifications, such as expanded calendar notification 20A, can indicate the name of the calendar notification and the time and location related to the calendar event, if known. Similarly, expanded email notification 20B includes information about one or more received emails, including the sender and a portion of each the receive email messages.

Expanded email notification 20B illustrates one version of a notification format that is different than the version notification format of calendar notification 20A. The notification format of expanded email notification 20B may be referred to as an expanded notification format and includes information about several different notification events compiled into one notification and, as shown in FIG. 1, includes information about emails received from three different contacts. The expanded notification format may be preferred in certain contexts, as it may include more information in less space than a notification that includes information about a single notification event.

Expanded text message notification 20C is another example of an expanded notification. Instead of displaying information regarding multiple notification events in one notification box, as illustrated by expanded email notification 20B, expanded text message notification 20C includes more information about a single notification. For example, expanded text message notification 20C may include a thumbnail photograph associated with a contact who sent the text message, the contact's name, and the first two lines of the text message.

Expanded notifications (notifications 20A-20C) may appear visually larger than non-expanded (i.e., collapsed) notifications (notifications 20D-20G). Collapsed notifications 20D-20G may take up less space in the notification center GUI 14 displayed at UID 12. Collapsed email notification 20D indicates the number of new emails and the email account associated with the notification. In contrast, expanded email notification 20B includes the contact and content information for the last three received but unread email messages. Similarly, collapsed calendar notification 20E includes a simple notification of the number of calendar items associated with events occurring today as compared to the additional calendar event details (e.g., the name, time, and location of the calendar event) included in expanded calendar notification 20A. Collapsed text message notification 20F includes an indication that eight text messages were received by computing device 10, including names for at least a portion of the contacts associated with the text messages, but not including content of the text messages.

Collapsed game notification 20G is an example of a combined game notification that includes notifications received from three different game applications. Collapsed game notification 20G includes an indication of the number of game status notifications received and the name of one of the three games from which game status notifications were received. As shown in FIG. 1, each of collapsed notifications 20D-20G includes multiple notifications associated with various events and that may be received from multiple contacts, multiple game applications, or multiple calendar events. In generating each of collapsed notifications 20D-20G, the received notifications may be aggregated based on the source of the notification (e.g., the application that sent the notification, the contact associated with the notification, etc.). By displaying the aggregated notifications as a single notification within an amount of space typically required to display a single notification, notification module 16 can reduce the number of notifications and the amount of space required to display the notifications within the notification center GUI 14. In this manner, notification module 16 can combine and display less important notifications in the notification center GUI in a more space efficient manner.

Computing device 10 may include notification module 16 and application modules 18A-18N (collectively, "application modules 18"). Notification module 16 and application modules 18 may perform operations described herein using software, hardware, or a mixture of both hardware and software residing in and executing on computing device 10. Computing device 10 may execute notification module 16 and/or application modules 18 with one or more processors. In some examples, computing device 10 can execute notification module 16 and/or application modules 18 as a virtual machine executing on underlying hardware.

Notification module 16 generates and outputs contextual notifications for all application modules 18 executed by computing device 10. In accordance with one or more aspects of the disclosure, notification module 16 is configured to, upon receiving an instruction from one of application modules 18 to generate a contextual notification, assign the contextual notification to at least one of a plurality of notification classes. In some implementations, notification module 16 may first generate a notification object associated with the information received from the application module 18. The notification object may be a placeholder for the contextual notification that notification module 16 will ultimately generate and may be associated with information that will populate the contextual notification, which was received from the application module 18. Notification module 16 may assign the notification object to the at least one notification class based on, for example, the information associated with the notification object and a contextual information associated with one or more of application modules 18, with a user of device 10, or with at least one sensor operably coupled to device 10. In other implementations, the notification object need not be different than the notification itself, e.g., notification module 16 may generate the contextual notification, populate the contextual notification with the notification information, and assign the contextual notification to at least one of the plurality of notification classes.

In some examples, the information associated with the notification object may include information that, in combination with other, contextual information available to notification module 16, may indicate a predicted importance to the user of the information associated with the notification object. For example, the information associated with the notification object may include content of a calendar event (including time, date, location, attendees, etc.), content of a communication (including the identity of the sender, the body of the communication, etc.), a phone number (or caller identification), or other content of notification generated by other types of application modules 18 (e.g., a game, news application, weather application, application marketplace, social networking application, a navigation or map application, etc.).

Notification module 16 may analyze the information associated with the notification object in combination with contextual information available to notification module 16. Contextual information may only available to computing device 10 and notification module 16 if a user of computing device 10 provides permission for notification module 16 to access the relevant information. For example, prior to accessing any information or determining any context, notification module 16 may provide a notification requesting user permission to access various type of information. Further, after a user grants access to the information, the user may revoke access at any time. The notification module 16 or a system-wide settings application or service may provide a configuration user interface that enables the user to select the scope of information the user to which access is granted to the notification module 16.

If the user approves access of contextual information by notification module 16, notification module 16 may access at least one of information associated one or more of application modules 18 (including the application module 18 which generated the instruction to generate the contextual notification and, in some cases, other ones of application modules 18), information associated with a user of computing device 10, or information associated with at least one sensor of computing device 10. Notification module 16 may analyze this data in combination with the information associated with the notification object when assigning the notification object to at least one notification class.

Information associated with one or more of application modules 18 may include, for example, contact information from a contact manager application, location history from a navigation or map application, calendar appointments from a calendar application, message contents from an email, text message, or social networking application, search history from an internet browser application or a dedicated search application or service, information regarding historical access by the user of similar information or notifications, and other information stored at or accessible by computing device 10. In some instances, some contextual information, such as search history, message contents, calendar appointments, location history, contact information, etc. may be associated with a user account instead of or in addition to being associated with one or more of application modules 18. For example, a user may create a user account for one or more internet-enabled services, and the user may sign into the user account across multiple devices. The user account or applications associated with the user account may request permission of the user prior to tracking and/or storing any information associated with the user's account. Further, after a user grants access to the information, the user may revoke access at any time.

Notification module 16 also may analyze information associated with at least one sensor of computing device 10, such as geolocation (e.g., from a global positioning sensor (GPS), a cellular tower to which computing device 10 is connected, a wireless network, e.g., Wi-Fi network, to which computing device 10 is connected, etc.). Similarly, notification module 16 may access and analyze information associated with other sensors of device 12, such as an accelerometer, a proximity sensor, a magnetic field sensor, a microphone, a presence-sensitive input device, a camera, etc.

Additionally or alternatively, in some examples, notification module 16 can analyze other contextual information, such time of day, other people physically located near computing device 10, and other such factors to determine the user's context and determine to which notification class notification module 16 should assign the notification.

Notification module 16 may analyze any of the contextual information described above to determine one or more attributes of the notification object, and may base the classification of the notification object on at least one of these attributes. For example, notification module 16 may analyze the contextual information to predict whether the user will consider the information associated with the notification object to be urgent or non-urgent. In some implementations, notification module 16 may predict urgency of the notification object based at least in part on, for example, the application module 18 from notification module 16 received the notification instruction. For example, notification module 16 may predict incoming phone calls to always be urgent or to be urgent when coming from certain phone numbers, while the notification module 16 may predict a notification from a game to never be urgent.

In some cases, notification module 16 may predict urgency of the notification object based on the information associated with the notification object. For example, notification module 16 may predict that an email message received from spouse, child, or boss of the user is urgent, while an email message received from a sender who is not a contact of the user is not urgent.

Notification module 16 also can analyze any of the contextual information to determine whether the information associated with the notification object is related to a task that the user is currently performing using computing device 10. For example, notification module 16 may analyze information associated with one or more of application modules 18 that are being executed by computing device 10, e.g., application modules 18 that are actively causing UID 12 to output a user interface 14, or application modules 18 that have recently been causing UID 12 to output a user interface 14. Application modules 18 that are actively causing UID 12 to output a user interface 14 or have recently been causing UID 12 to output a user interface 14 may indicate that the user of computing device 10 is currently or has recently used that application to accomplish a task.

Notification module 16 also can analyze whether the user requested specific information to which the information associated with the notification object relates. For example, notification module 16 may receive indications of prior searches performed by the user using computing device 10 or another computing device associated with a user account of the user. Notification module 16 may compare the information associated with the notification object to the prior searches (e.g., keywords used in the search) to determine whether the user requested similar information. Based on this, notification module 16 may assign a requested or unrequested attribute to the notification object.

In some instances, notification module 16 can analyze the information associated with the notification object and the contextual information using a predefined algorithm, e.g., an algorithm that is not adaptive and does not change based on responses received from the user regarding the contextual notifications generated and output by notification module 16. In other examples, notification module 16 can analyze the information associated with the notification object and the contextual information using an adaptive algorithm, e.g., an algorithm that adjusts assignment of the notification object in response to user input received regarding the contextual notifications. For example, notification module 16 may adjust the algorithm based on which contextual notifications the user accesses first, which may indicate a relative importance of the contextual notification to the user. In some instances, notification module 16 may track user responses over time, and change assignment of future notification objects of based on the response of the user to past notifications of similar type. Notification module 16 may consider, for example, the application from which the notification originated, a person associated with the notification (e.g., a sender of a communication), etc.

Although the foregoing example describes three binary attribute pairs (requested/unrequested, urgent/not urgent, and related to current task/not related to current task), notification module 16 may use fewer attributes, more attributes, or other attributes in assigning a notification object to at least one notification class. Additionally or alternatively, notification module 16 may use attributes that are not binary, e.g., that have a scale of values, such as very urgent, urgent, not urgent, very not urgent.

Once notification module 16 has determined attributes of the notification object, notification module 16 may assign the notification object to at least one notification class from a plurality of notification classes. Although notification module 16 can be configured with any number of notification classes, and the notification classes can be determined based on any number of attributes, the following example includes four notification classes formed based on combinations of three binary attribute pairs (requested/unrequested, urgent/not urgent, and related to current task/not related to current task).

One notification class may be referred to as a supportive notification class. The supportive notification class can be associated with notifications that were not requested by the user, are not predicted to be urgent, and are related to a current task that the user is performing using computing device 10. Supportive notifications can facilitate completion of the user's current task or goal. In some examples, notifications assigned to the supportive notification class may create shortcuts that facilitate or accelerate the user's current task or goal. Because of this, notification module 16 may output supportive notifications for display at UID 12 in a region of user interface 14 that is adjacent to the current user interface 14 being displayed at UID 12 in a manner that is integrated with the current user interface 14. For example, if notification module 16 predicts, based on information associated with one or more of application modules 18, that the user intends to call a particular contact when the user opens the phone application, the notification module 16 may output the contact's name at a prominent position within the phone application user interface.

As one example, the user of computing device 10 may have previously opened a calendar application and viewed the current day. If today is the user's sister's birthday, notification module 16 may receive information regarding this. If the user then opens the phone application, notification module 16 may cause the user's sister's name to be prominently displayed in the phone application user interface in a manner that is integrated with the phone application user interface. For example, notification module 16 may cause the user's sister's name to be displayed at a top of a call history list or a contact list within the phone application user interface. In this way, notification module 16 may output a supportive notification that facilitates accomplishment of the user's goal or task of calling his or her sister to wish her "Happy Birthday."

Another notification class may be referred to as a demanded notification. The demanded notification class can be associated with notifications that are requested by the user, not predicted to be urgent, and related to a current task that the user is performing using computing device 10. Demanded notifications can provide information to the user of computing device 10 in response to requests from the user for that information. In some examples, notification module 16 may output demanded notifications for display at UID 12 in a user interface 14 that the user explicitly entered, such as a dedicated search application, or a search result page in an Internet browser.

For example, when computing device 10 may receive, from the user using UID 12 or another input device (such as a microphone), an instruction to provide directions to the nearest coffee shop. In response, a maps application, navigation application, or search application may retrieve a location of the nearest coffee shop and provide this location to the maps application or navigation application. The maps application or navigation application then may generate a route to the coffee shop, and generate an instruction to notification module 16 to generate and output a notification with the route information. Based at least in part on the search query (provided to notification module 16 by the maps application, navigation application, or search application) and the information received with the instruction from the maps application or the navigation application, notification module 16 may assign the notification to the demanded notification class. Notification module 16 then can cause the notification including the route information to be displayed at UID 12 in the user interface 14 that the user is in, e.g., the search application.

Another notification class can include interruptive notifications. The interruptive notification class may be associated with notifications that are not requested by the user, are predicted to be urgent, and may or may not be related to a current task that the user is performing using computing device 10. Notification module 16 may cause interruptive notifications to be displayed at UID 12 in a region of UID 12 that is adjacent to the current user interface 14 displayed at UID 12. In addition, notification module 16 may cause interruptive notifications to be displayed at UID 12 in manner that is clearly differentiated from the current user interface 14 displayed at UID 12, to improve a chance that the user notices display of the interruptive notification at UID 12. For example, notification module 16 may cause the interruptive notification to appear to slide in from an edge (e.g., top, bottom, or side) of UID 12 toward a middle of UID 12. Examples of interruptive notifications are described below with reference to FIG. 2.

Another notification class can include opportunistic notifications. The opportunistic notification class can be associated with notifications that are not requested by the user, are not predicted to be urgent, and are not related to a current task that the user is performing using computing device 10. Opportunistic notifications can provide information in a manner that does not interrupt the current task the user is performing using computing device 10, but which may be useful to the user, e.g., at a time when the user is switching tasks. In some examples, notification module 16 may output opportunistic notifications for display at UID 12 in a user interface 14 that facilitates task switching, such as a home screen, a notification user interface, a task switching user interface, a lock screen user interface, etc. In this way, notification module 16 may cause the opportunistic notification to be displayed to the user at the next time the user is switching tasks (e.g., applications) performed using computing device 10 or when the user unlocks computing device 10 from a standby or powered off state.

User interface 14 shown in FIG. 1 illustrates some example notifications generated by notification module 16 in response to instructions received from application modules 18, as described above. In some implementations, in addition to outputting the notifications for display in the respective user interface contexts described above, notification module 16 may output notifications from some or all of the notification classes to be displayed at UID 12 in notification center GUI 14. In some instances, notification center GUI 14 may provide a consistent location to which the user knows to look for all notifications.

In some cases, notification module 16 may initially assign a notification object to a first notification class, and then, based on changing contextual information, reassign the notification object to a second, different notification class. For example, if a user is currently engaged in a task using computing device 10, and notification module 16 receives an instruction to generate a contextual notification including information related to the task, notification module may output the contextual notification as a supportive notification (in a user interface region adjacent to the current GUI 14 displayed at UID 12 in a manner that is integrated with the current GUI 14). If the user does not utilize the information from the supportive notification while performing the task, notification module 16 may reassign the notification object based on the information associated with the notification object and the current contextual information. For example, the current contextual information and the information associated with the notification may indicate that the notification module 16 should reassign the notification object to the opportunistic notification class and output the contextual notification based at least in part on its classification to the opportunistic notification class.

In some implementations, notification module 16 also may dismiss contextual notifications without a user's instruction. For example, For example, if a user is currently engaged in a task using computing device 10, and notification module 16 receives an instruction to generate a contextual notification including information related to the task, notification module may output the contextual notification as a supportive notification. If the user does not utilize the information from the supportive notification while performing the task, notification module 16 may determine, based on contextual information and the information associated with the contextual notification, that the information associated with the supportive notification will no longer be relevant to the user. Instead of reclassifying the notification object into a different notification class, notification module 16 can instead dismiss the supportive notification, and cease to output the supportive notification.

As another example notification module 16 may receive from a phone application an instruction to generate a notification of a missed telephone call. Notification module 16 may initially generate a notification object for the missed phone call, assign the notification object to at least one notification class based on contextual information and the information associated with the missed phone call, generate a notification based at least in part on the assigned notification class, and output the notification of the missed phone call based at least in part on the assigned notification class. If the user of computing device 10 later completes a successful communication (e.g., a phone call with the caller of the missed phone call, an email to the caller, a text message to the caller, etc.) notification module 16 may receive an indication of this successful communication. Based on this indication of the successful communication, notification module 16 may dismiss the notification of the missed phone call, and cease to output the notification.

While notifications 20 have been described as visual notifications output for display at UID 12, in other examples, a contextual notification may be output in one or more additional or different format. For example, notification module 16 may output a signal for playing at a speaker, i.e., an audible alert, such as a chime, a ring, etc. As another example, notification module 16 may output a signal for causing a tactile notification, e.g., causing an eccentric motor that causes computing device 10 to vibrate. Notification module 16 may output contextual notifications for presentation to the user in any combination of visual, tactile, or audible formats. In some examples, the format in which notification module 16 outputs the contextual notification may be based at least in part on the classification of the contextual notification.

By assigning notifications to at least one notification class based at least in part on information associated with the notification and contextual information, notification module 16 may facilitate presentation of information to the user of computing device 10 in a manner that is useful to the user and may prevent presentation of notifications predicted to be less urgent to the user at a time when the user is engaged in another task. In this way, notification module 16 may facilitate the user accomplishing tasks or goals using computing device 10 while providing information to the user in a convenient GUI context. Moreover, notification module 16 may assist the use in differentiating between information that is urgently important and information that may be less important or less time-sensitive.

Figure 2:
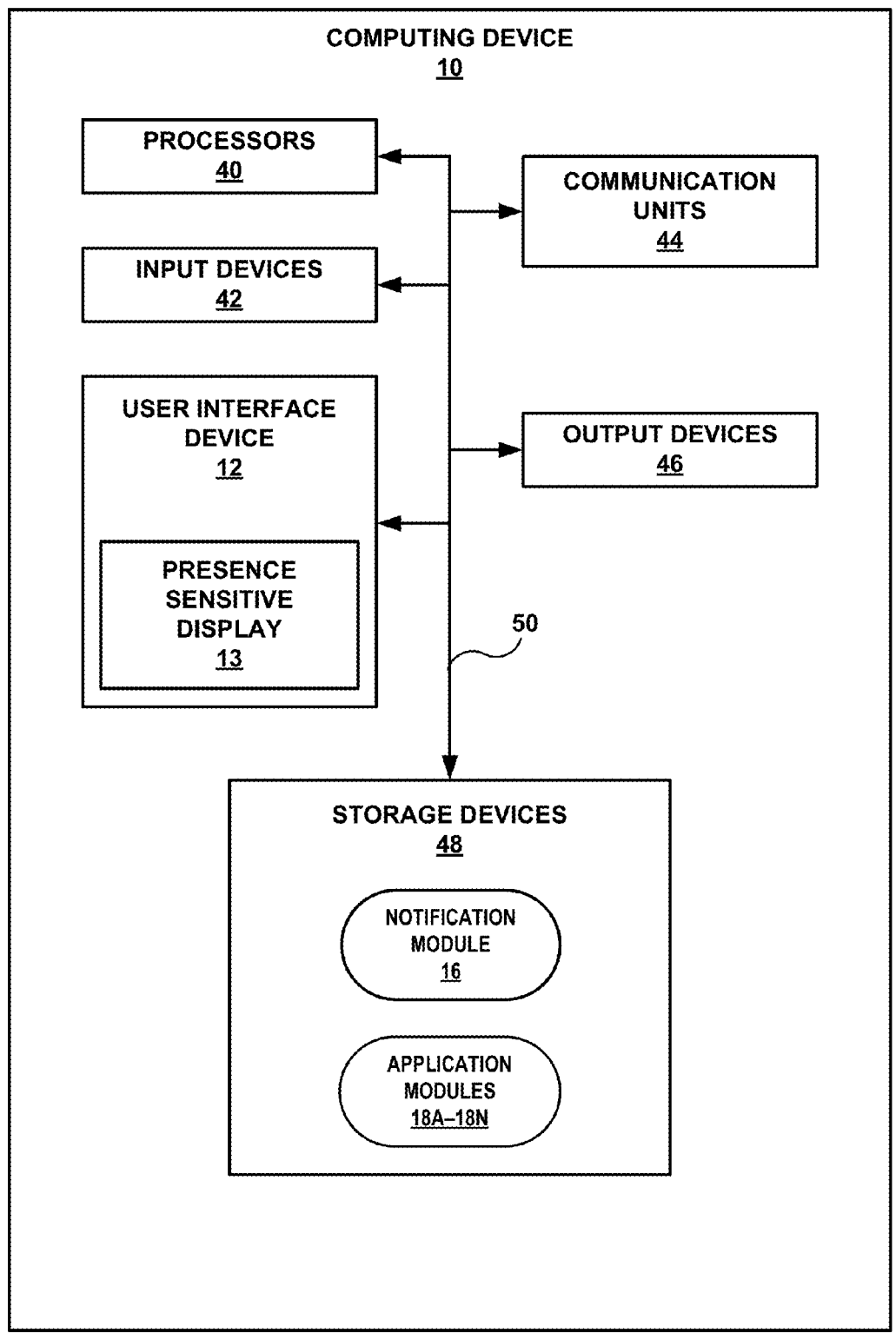
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. In other examples, computing device 10 can include fewer, additional, or different components compared to those illustrated in FIG. 2. For example, although user interface device 12 ("UID 12") is shown in FIG. 2 as being integral with computing device 10, in other implementations, UID 12 may be operably coupled to computing device 10, e.g., by a wired or wireless data connection. As shown in the example of FIG. 2, computing device 10 includes UID 12, one or more processors 40, one or more input devices 42, one or more communication units 44, one or more output devices 46, and one or more storage devices 48. In this example, UID 12 also includes presence-sensitive display 13 while storage devices 48 of computing device 10 also include notification module 16 and application modules 18. Communication channels 50 may interconnect each of the components 12, 13, 16, 18, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display (e.g., presence-sensitive display 13), touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

UID 12 of FIG. 2 includes presence-sensitive display 13 (hereafter "display 13"). Computing device 10 may use display 13 as an input device and an output device. For example, display 13 of UID 12 may include a touchscreen configured to receive tactile user input from a user of computing device 10. Display 13 of UID 12 may also include an LED display capable of outputting visible information to the user of computing device 10. UID 12 may present a user interface on display 13, such as notification center GUI 14 of FIG. 1, that may be related to functionality provided by computing device 10. For example, display 13 of UID 12 may present various functions and applications, such as an electronic message client, a map application, an Internet browser for accessing and downloading information from the Internet, and a social media application. In another example, display 13 of UID 12 may present a menu of options related to the function and operation of computing device 10, such as screen brightness and other configurable mobile phone settings.

One or more storage devices 48 within computing device 10 may store information required for use during operation of computing device 10 (e.g., application modules 18 of computing device 10 may store information related to operation of the respective one of application modules 18). Storage devices 48, in some examples, have the primary purpose of being short term and not long-term computer-readable storage mediums. Storage devices 48 on computing device 10 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with notification module 16 and application modules 18.

One or more processors 40 may implement functionality and/or execute instructions within computing device 10. For example, processors 40 on computing device 10 may read and execute instructions stored by storage devices 48 that execute the functionality of notification module 16 and application modules 18. These instructions executed by processors 40 may cause computing device 10 to store information within storage devices 48 during program execution, such as notifications, notification objects, and/or information associated with notifications stored by notification module 16. Processors 40 may execute instructions of modules 16 and 18 to assign notification objects to at least one notification class, generate the notification, and output the notification based at least in part on the at least one notification class. That is, modules 16 and 18 may be operable by processors 40 to perform various actions, including generating and outputting notifications.

Similar to the description of FIG. 1, computing device 10, or, more particularly, application modules 18 executed by one or more processors 40, of FIG. 2 may generate and/or receive information for a user of device 10, such as incoming communications, location information, navigation information, game information, calendar information, etc. Some of this information may be presented to the user of computing device 10 using notifications. Notification module 16 may receive an instruction to generate a notification from application modules 18 that generate or receive the information. The instruction may include a command to generate a notification and information with which to populate the notification. The information may include, for example, information shown and described with respect to notifications 20 of FIG. 1. In other examples, the information may include any other information that the application module 18 determines should be output in a notification, such as a severe weather alert, an indication that updates to one or more applications are available from an application store, a new headline, a to-do list reminder, a reading reminder, etc.

In response to receiving the instruction to generate the notification, notification module 18 may generate a notification object. The notification object may be a placeholder for the notification that notification module 16 will ultimately generate and populate with the information received from the application module 18, but may not be populated with the information.

Notification module 16 then can assign, based on the information associated with the notification object and other contextual information, the notification object to at least one of a plurality of notification classes. As described above, in some implementations, the plurality of notification classes may include four notification classes: supportive notifications, interruptive notifications, demanded notifications, and opportunistic notifications. In other examples, the plurality of notifications classes may include more than four notifications classes or fewer than four notification classes. In general, the plurality of notification classes can include at least two notification classes. Additionally or alternatively, at least one of the notification classes may be different than the four classes described herein, e.g., may be defined based on different attributes of the notification, or labeled different names.

For example, notification module 16 can analyze the information associated with the notification object in combination with contextual information including, for example, information associated with one or more of application modules 18, information associated with a user account of the user of computing device 10, and/or information associated with at least one sensor of computing device 10. Notification module 16 may assign the notification object to the at least one notification class based on this analysis.

As described above, one notification class can include supportive notifications. The supportive notification class can be associated with notifications that were not requested by the user, are not predicted to be urgent, and are related to a current task the user is performing using computing device 10. As an example, notification module 16 may classify a notification object in the supportive notification class in the following case. A user of device 10 may gesture or tap presence-sensitive display 13 at a location corresponding to an icon of a calendar application. In response, processors 40 may execute a calendar application module. If today is the user's sister's birthday, the calendar application may transmit an indication of this to notification module 16, which may receive the indication. If the user switches to a phone application, e.g., using one or more gestures or taps at appropriate locations of presence-sensitive display, notification module 16 analyze the information that it received from the calendar application (that today is the user's sister's birthday) along with information that the user is currently in the phone application module.

Based on this information, notification module 16 may assign the notification of the sister's birthday into the supportive notification class. Further, notification module 16 may generate a notification based at least in part on the classification of the notification in the supportive notification class and present the notification to the user based at least in part on the assignment of the notification to the supportive notification class. For example, notification module 16 may be configured to output supportive notifications for display at presence-sensitive display 13 in a user interface context that is adjacent to or within a current user interface being displayed at presence-sensitive display 13 and in a manner that is integrated with the current user interface. In this example, that may mean that notification module 16 outputs within the context of the phone application module user interface the user's sister's phone number.

In some examples, notification module 16 may output the user's sister's phone number as part of a list of suggested phone numbers, e.g., a list of recent calls, favorite contacts, etc. In some implementations, notification module 16 may output the user's sister's phone number in a prominent manner within the phone application user interface, such as at the top of the screen, in a different font size or font type, or with some other distinguishing mark. In some examples, may notification module 16 may output the user's sister's phone number next to an indication that it is her birthday. In this way, notification module 16 may output a supportive notification that facilitates accomplishment of the user's predicted goal or task of calling his or her sister to wish her "Happy Birthday."

As another example, notification module 16 may classify a notification object in the supportive notification class in the following situation. A user of device 10 may gesture or tap presence-sensitive display 13 at a location corresponding to an icon of a camera application. In response, processors 40 may execute a camera application module. If the user takes a picture using the camera, the camera application module may transmit an indication of this to notification module 16, which may receive the indication. If the user switches to an email application, e.g., using one or more gestures or taps at appropriate locations of presence-sensitive display, notification module 16 can analyze the information that it received from the camera application (that the user just captured a picture) along with information that the user is currently in the email application module.

Based on this information, notification module 16 may assign the notification of the picture into the supportive notification class. Further, notification module 16 may generate a notification based at least in part on the classification of the notification in the supportive notification class and present the notification to the user based at least in part on the assignment of the notification to the supportive notification class. For example, notification module 16 may output a notification of the recent picture within the context of the email application module user interface, e.g., as a suggested attachment for the email. As another example, notification module 16 may not output a notification of the recent picture until the user selects an "attachment" user interface element. Notification module 16 may receive an indication of the email application receiving such an instruction, and based on the application context of selecting an attachment for an email and the recent capture of the picture, notification module 16 may output the picture as a suggested attachment for the email, e.g., as a first item in a list of files or objects from which the user selects email attachments. In some examples, notification module 16 may output the picture in a prominent manner within the phone application user interface, such as in a different font size or font type, as a thumbnail image of the picture, or with some other distinguishing mark. In this way, notification module 16 may output a supportive notification that facilitates accomplishment of the user's predicted goal or task of attaching the recently captured image to an email.

Figure 3A:
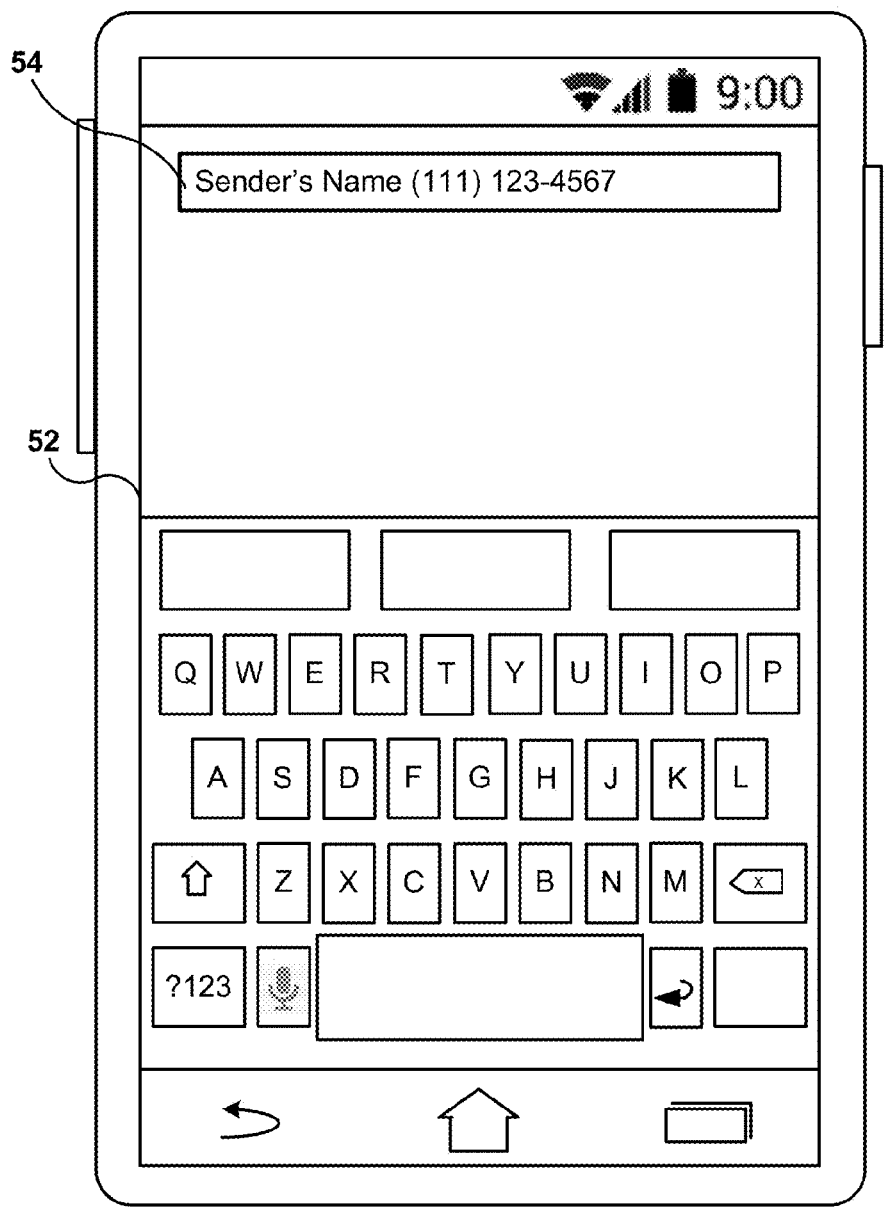
FIGS. 3A-3C are conceptual diagrams illustrating example user interface screens at which a notification module may cause contextual notifications to be displayed, in accordance with one or more aspects of the present disclosure.

As another example, notification module 16 may classify a notification object in the supportive notification class in the following occasion. A communication application, such as an email application or a text message application, may receive a message from a sender. Later, in response to a signal received by processors 40 indicating an input from a user at presence sensitive display 13, processors 40 may execute the communication application. An example of a communication application user interface screen 52 is shown in FIG. 3A. Notification module 16 may receive from the communication application an instruction to generate a notification of the message. Based on the information associated with the instruction and an indication that the user has opened the communication, the notification module 16 may assign the notification of the communication to a supportive notification class. Notification module 16 may then generate a notification that includes the sender's contact information (e.g., cellular phone number, email address, etc.). Notification module 16 may output the notification for display in at the communication user interface screen context of the communication application user interface screen 52. For example, notification module 16 may cause a user input region 54 in which the user of device 10 enters the recipient's name (i.e., the "To:" field) to be populated with the sender's name, phone number, and/or email address, either upon opening of the communication application or upon receiving a signal from presence-sensitive display 13 indicating a user input gesture at user interface region 54. In this way, notification module 16 may generate and output a supportive notification that facilitates response to the received communication.

As an additional example of supportive notifications, notification module 16 may receive an instruction from a to-do list to generate a notification. The instruction to generate the notification may include information regarding one or more tasks on the user's to-do list, such as purchasing something at a particular store. At the same time or a later time, notification module 16 may receive information regarding a navigation route from a current location to a destination from, for example, a maps application or a navigation application. Based on the information regarding the one or more tasks on the user's to-do list and the navigation route, notification module 16 may determine whether a location at which one or more of the tasks can be accomplished is near the proposed navigation route. In some examples, notification module 16 may exchange information with the maps or navigation application or another application, such as an internet search application, to make the determination of the relative locations of the navigation route and the place where the user can accomplish one or more of the tasks.

When notification module 16 determines that the location for accomplishing the task and the navigation route are within a certain (e.g., predefined or user-defined) distance of each other, notification module 16 may assign the to-do list notification and/or a navigation route notification to a supportive notification class. Notification module 16 may generate the notification and output the notification for display at presence-sensitive display.

For example, notification module 16 may generate a notification that asks the user whether they would like to modify their navigation route to travel to the location where the task can be accomplished. The notification may be presented in the maps or navigation application user interface, and may include user interface elements that allow the user to accept or reject the proposed modified navigation route.

In other examples, notification module 16 may generate a notification that is displayed as an alternate navigation route on a map displayed in the maps or navigation application. The alternate route may include a place marker that highlights the location at which the user can accomplish the task from the to-do list and a short description of the location or task to inform the user of the reason for the place marker. In this way, notification module 16 can generate and output a supportive notification that facilitates the user accomplishing tasks on his or her to-do list during a planned trip.

As another example of a supportive notification, a user of computing device 10 may be at a scheduled meeting. Computing device 10 (e.g., processors 40 executing one or more application modules or operating system services) may determine that the user is present at the meeting using a variety of signals, such as a meeting event stored in a calendar application; a location of the device based on, e.g., a Wi-Fi network to which device 10 is connected or a GPS signal received by computing device 10; and a time of day and day of the week. In some cases, computing device 10 (e.g., processors 40 executing one or more application modules or operating system services) also can be aware of other people scheduled to be in the meeting, e.g., based on information associated with the calendar meeting event. Notification module 16 may have access to this information. For example, the calendar application may send this information to notification module at the time of the scheduled meeting or at a predetermined time prior to the meeting (e.g., for a meeting reminder notification). In other examples, notification module 16 can access a central repository of information maintained by the operating system of computing device 10 or application modules 18.

Continuing the example, processors 40 may receive a signal from presence-sensitive display 13 indicating user input at display 13 instructing the device to share a document, such as a word processing document, a presentation, or a spreadsheet. Based on the signal indicating that the user intends to share a document and the information regarding other people in the meeting with the user, notification module 16 may generate a notification that includes the name, email address, or other contact information of one or more people present in the meeting with the user of device 10. Notification module 16 may output the notification for display at presence-sensitive display 13 in a user interface region within the context of the document sharing application. For example, notification module 16 may output the notification for display at presence-sensitive display 13 in list of potential people with whom to share the document. As described above, notification module 16 may output the notification in a prominent format, such as a top of a list, in a different font or font size, etc. In this way, notification module 16 can facilitate the task of sharing documents with other attendees of the meeting.

As described above, another notification class can include demanded notifications. The demanded notification class can be associated with notifications that were requested by the user, are not be predicted to be urgent, and are related to a current task the user is performing using computing device 10. For example, the user may perform an Internet search using a dedicated search application or a website accessed using an Internet browser. Notification module 16 may receive a signal from the dedicated search application or Internet browser to generate a notification that includes the results of the search performed by the search application or Internet browser. In some examples, notification module 16 may analyze in combination with the search results other contextual information, such as information associated with one or more other application modules 20, information associated with the user, or information associated with at least one sensor of computing device 10. For example, notification module 16 may analyze the search results in combination with a geolocation of computing device to predict relevant search results. Notification module 16 then can generate a demanded notification and output the demanded notification for display in a region of a user interface displayed at presence-sensitive display 13. The user interface may be one that the user explicitly entered before requesting the information, such as a dedicated search application or a search engine website accessed using an internet browser. For example, notification module 16 may output the demanded notification for display as part of a set of search results to the user's search query.

Another notification class includes interruptive notifications. As described above, the interruptive notification class is associated with notifications that were not requested by the user of computing device 10, are predicted to be urgent, and are not related to a current task that the user is performing using computing device 10. One example in which notification module 16 may assign a notification object to the interruptive notification class is when device 10 (e.g., communication units 44) receives an incoming communication (e.g., a phone call, email, text message, etc.). In some examples, notification module 16 may be configured to assign all incoming communications to the interruptive notification class. In other examples, notification module 16 may consider information associated with the incoming communication (e.g., an identification of a person from whom the communication originated or a content of the communication) and contextual information to determine to which class to assign the phone call.

For instance, a user may configure computing device 10 in a silent mode of operation (or a do-not-disturb operation mode), e.g., using a settings menu displayed at presence-sensitive display 13. In the silent mode of operation, notification module 16 (and, in some cases, a phone application) may be configured to not cause a speaker to output a sound upon receiving a phone call, message, or other event. In some examples, the silent mode of operation also may disable tactile outputs of notifications. Hence, when computing device 10 is configured in a silent mode of operation, notification module 16 may only output contextual notifications, such as notifications of phone calls, for display at presence-sensitive display 13, e.g., may assign all notifications to an opportunistic notification class and output the notifications for display at presence-sensitive display 13 in a notification manager user interface, a lock screen user interface, or a home screen user interface. However, if the computing device 10 is in a physical location where the user cannot see the screen, e.g., in the user's bag or pocket, the user may not become aware of the notification.

In some implementations, when computing device 10 is configured in the silent mode of operation, notification module 16 may analyze information associated with the incoming communication to determine whether to assign the incoming communication to the interruptive notification class an output the contextual notification in a more interruptive format, e.g., a tactile or audible notification, overriding the silent mode of operation. For example, if computing device 10 receives multiple communications from the same person within a predetermined period of time (which may be set by notification module 16 or the user of the device), notification module 16 may override the silent mode and output one or more contextual notifications for presentation using a speaker or tactile device. The multiple communications may include the same type of communications or different types of communications, such as an email, a text message, a phone call, and a voice mail, a social networking message, etc.

As another example, notification module 16 may assign at least some contextual notifications associated with a calendar application into the interruptive notification class. For example, notification module 16 may receive an instruction from the calendar application to generate a notification regarding an upcoming event, such as a meeting. In some examples, notification module 16 may assign all notifications regarding upcoming meetings to the interruptive notification class. In other implementations, notification module 16 may analyze information associated with the event, such as a name of the event, location of the event, time of the event, other attendees of the event, whether the user is required or optional, etc. in combination with contextual information to determine to which notification class to assign the event notification.

For example, notification module 16 may analyze a location of the upcoming event in combination with a location at which computing device 10 is positioned (e.g., a geolocation). Based on the analysis of the event location and device location, notification module 16 may generate and output one or more of a variety of contextual notifications. For instance, notification module 16 may assign the event notification to the interruptive notification class and output a contextual notification apprising the user that it is time to leave the current location to arrive at the meeting location on time. In some implementations, notification module 16 may also analyze information provided by a maps application or navigation application, such as route and traffic information, when providing the contextual notification that it is time for the user to leave to make the meeting on time.

In other examples, notification module 16 can analyze the event location and the location of computing device 10 and determine that the user is not likely to arrive at the meeting on time (e.g., based on the relative locations and the time until the meeting, alone or in combination with route and traffic information). Based at least in part on this determination, notification module 16 can assign the event notification object to the interruptive notification class. Notification module 16 can then output the event notification based at least in part on the assignment of the notification to the interruptive class. For example, notification module 16 can output a contextual notification that alerts the user to the upcoming event. In some instances, the contextual notification may include additional information or options for the user, such as a query of whether the user wants to send a message to the other attendees of the event alerting them that the user will likely be late or a cancellation notification to the other attendees of the event.

In some instances, notification module 16 may assign other contextual notifications to the interruptive notification class. For example, notification module 16 may receive an instruction to generate a notification that tomorrow is the user's spouse's birthday. Notification module 16 may also receive information indicating that a to-do list application has an unfinished entry regarding buying a present for the spouse. Based at least in part on the unfinished to-do list entry and the user's spouse's approaching birthday, notification module 16 may assign the notification object to the interruptive notification class. Notification module 16 then may populate the notification object with information, such as a description of the unfinished to-do list entry and a reminder that tomorrow is the spouse's birthday. Notification module 16 can output the contextual notification for display at presence-sensitive display 13, with or without an accompanying sound or tactile notification.

As another example, notification module 16 may assign some communication-related notifications to the interruptive notification class. For example, notification module 16 may receive an instruction from a communication application (such as an email application, text messaging application, social networking application, etc.) to generate a notification, along with information for the notification. The information for the notification may include, for example, an identity of the sender of the communication (e.g., a contact name, a phone number, an email address, etc.), a subject of the communication, or a body of the communication. In some examples, notification module 16 may analyze the notification information, alone or in combination with other contextual information, to determine in which notification category to assign the notification object.

In some examples, notification module 16 may assign the notification object to the interruptive notification class based on the notification information. For instance, the notification information may include an identity of the sender of the communication. If the sender is a known by notification module 16 to be a person in a predetermined or user-defined relationship with the user of device 10, notification module 16 may assign the notification object to the interruptive notification class. For example, predetermined or user-defined relationships may include a spouse, a partner, a significant other, a parent, a child, a boss, a coworker, etc.

Similarly, notification module 16 may assign the notification object to the interruptive notification class based on the subject of the communication or content of the body of the communication. For example, a notification for a communication that includes the word "Urgent" in the subject line or body of the communication may cause notification module 16 to assign the notification object to the interruptive notification class.

Figure 3B:
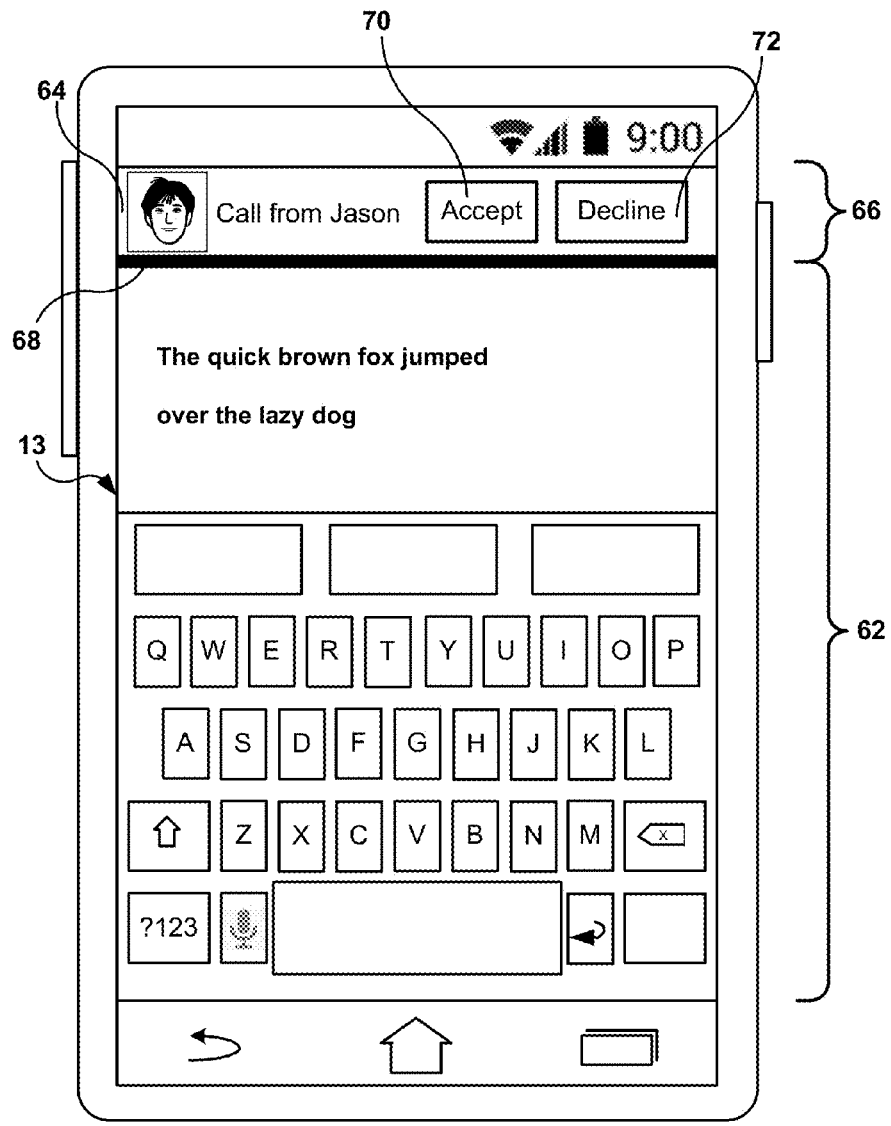

Notification module 16 may generate interruptive notifications and output them for presentation to the user at a tactile device (e.g., an eccentric motor that causes device 10 to vibrate), a speaker, or presence-sensitive display 13. In some examples, notification module 16 may output a visual notification for display at presence-sensitive display 13 in a region adjacent to the current user interface context displayed at presence-sensitive display 13 in a manner that is clearly differentiated from the current user interface context. For example, as shown in FIG. 3B, a current user interface context may include a messaging application user interface 62 displayed at presence-sensitive display 13. Notification module 16 may output an interruptive notification 64 that slides or pops into view adjacent to an edge of presence-sensitive display 13. The user interface context 66 of interruptive notification 64 is clearly differentiated from the messaging application user interface 62 by one or more user interface elements, such as line 68. In this example, interruptive notification 64 includes information regarding an incoming phone call, including the caller's picture and name. In this way, notification module 16 may prominently display interruptive notification 64 to the user at presence-sensitive display 13, but may reduce visual interference messaging application user interface 62 compared to, e.g., switching the entire user interface context to a phone application user interface.

In some examples, interruptive notification 64 may not require the user to interact with notification 64 to continue the task the user is performing using computing device 10. For example, the user may continue interacting with the messaging application using messaging application user interface 62 at presence-sensitive display 13 without dismissing or acknowledging interruptive notification 64. Alternatively, the user may interact with user interface elements 70 or 72 to accept or decline the incoming call, respectively.

Figure 3C:
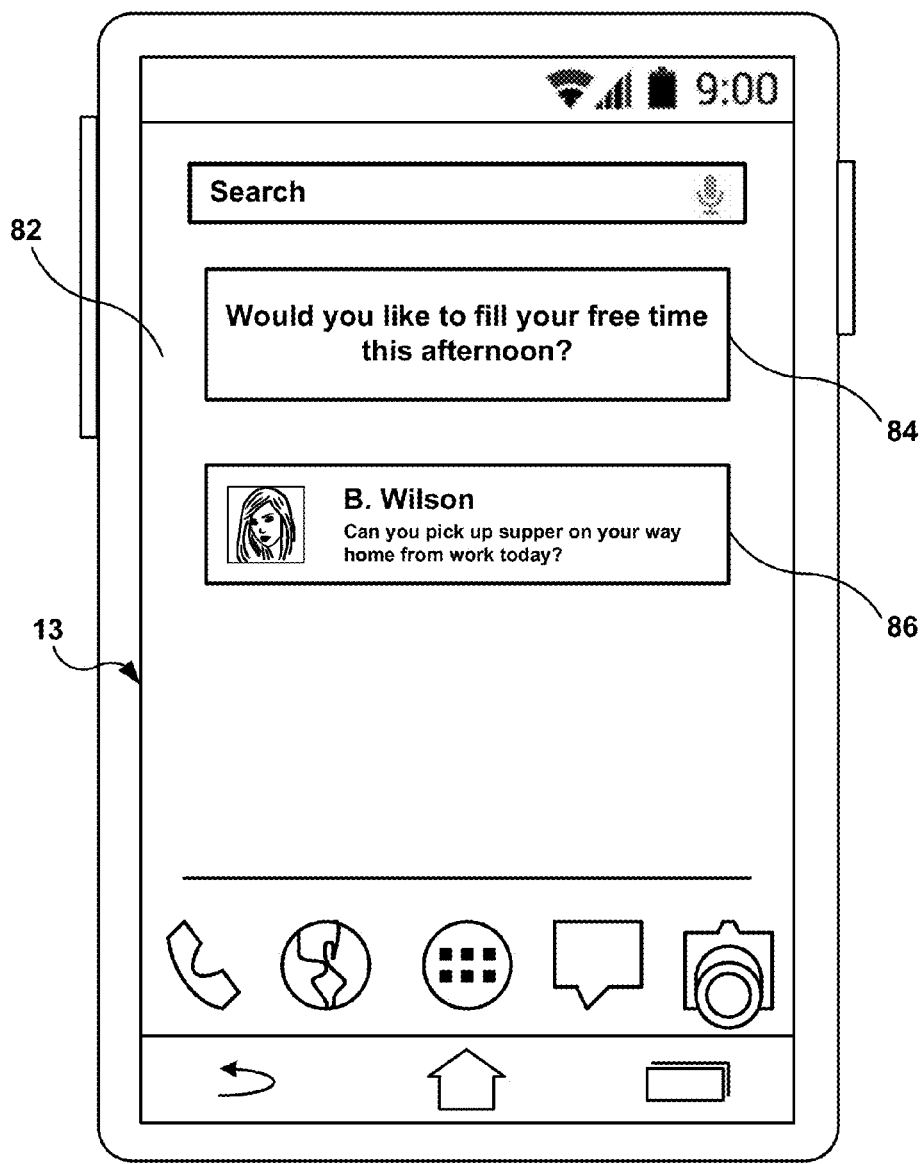

Another notification class can include opportunistic notifications. The opportunistic notification class can be associated with notifications notification module 16 predicts to not be urgent, are not related to a task that the user is performing using computing device 10, and are not related to information requested by the user using device 10. In some instances, notification module 16 may output opportunistic notifications for display at presence-sensitive display 13 in a user interface that facilitates task switching. For example, as shown in FIG. 3C, a user interface that facilitates task switching may include a home screen user interface 82. FIG. 3C illustrates two opportunistic notifications 84 and 86. First opportunistic notification 84 is a query asking whether the user of device wants to fill his or her free time in the afternoon. Notification module 16 may generate such a notification 84 upon receiving an instruction from a calendar application to generate a notification about a block of unscheduled time in the afternoon. Based on the notification information, alone or in combination with other contextual information, notification module 16 may assign the notification object to the opportunistic notification class and generate and output the notification for display at presence-sensitive display 13 in the manner shown in FIG. 3C.

Notification module 16 may generate second opportunistic notification 86 upon receiving an instruction form an email or messaging application to generate a notification about a received communication. Based on the notification information, alone or in combination with other contextual information, notification module 16 may assign the notification object to the opportunistic notification class. For example, notification module 16 may determine that the communication is not urgent, not related to information requested by the user, and not related to a current task being performed by the user using computing device 10 based on a sender of the communication, a subject of the communication, or content of a body of the communication. When notification module 16 assigns the notification object to the opportunistic notification class, notification module 16 can generate and output the notification for display at presence-sensitive display 13 in the manner shown in FIG. 3C.

In other implementations, notification module 16 may output opportunistic notifications for display at presence-sensitive display 13 in user interface contacts other than that shown in FIG. 3C. For example, notification module 16 may output opportunistic notifications for display at presence-sensitive display 13 in a notification center user interface, such as interface 14 shown in FIG. 1. Alternatively or additionally, notification module 16 may output opportunistic notifications for display at presence-sensitive display 13 in a lock screen user interface.

By assigning notifications to at least one notification class based at least in part on information associated with the notification and contextual information, notification module 16 may facilitate presentation of information to the user of computing device 10 in a manner that is useful to the user and may prevent presentation of notifications predicted to be less urgent to the user at a time when the user is engaged in another task. In this way, notification module 16 may facilitate the user accomplishing tasks or goals using computing device 10 while providing information to the user in a convenient GUI context. Moreover, notification module 16 may assist the user in differentiating between information that is urgently important and information that may be less important or less time-sensitive.

Figure 4:
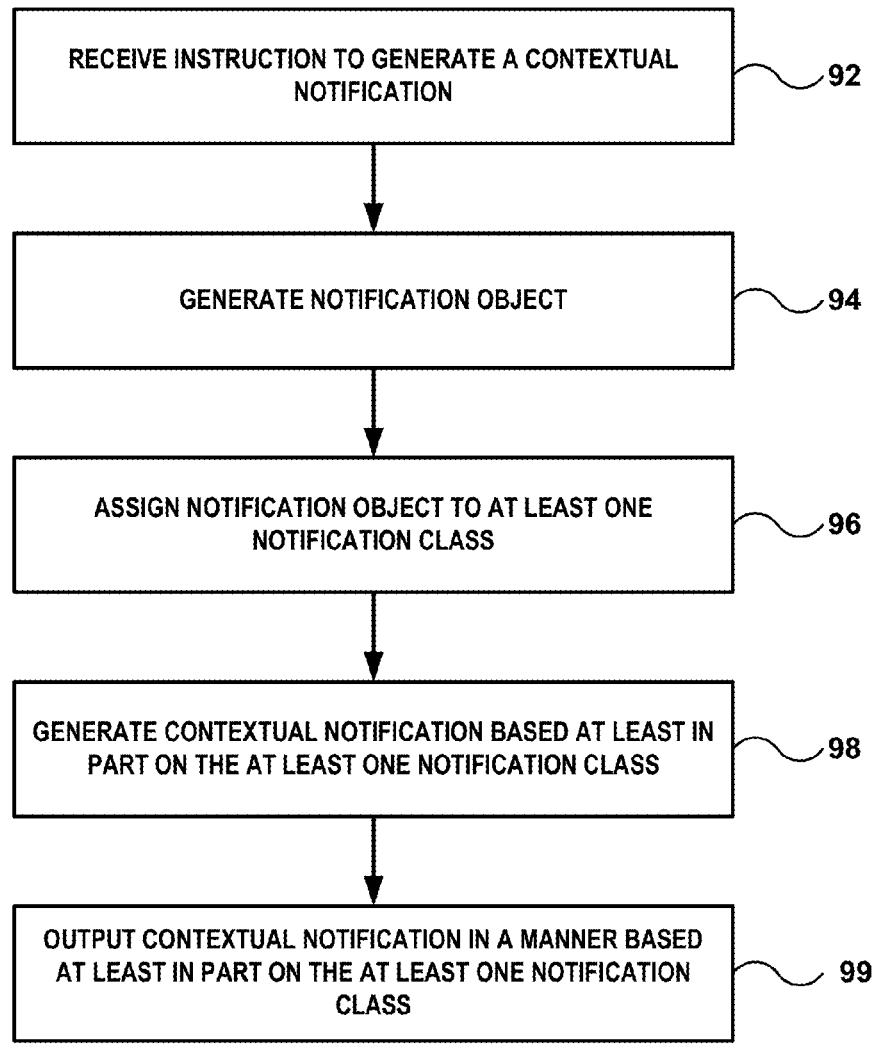
FIG. 4 is a flow diagram illustrating an example operation of the computing device, in accordance with one or more aspects of the present disclosure.

FIG. 4 is a flow diagram illustrating an example operation of the computing device, in accordance with one or more aspects of the present disclosure. The process of FIG. 4 may be performed by one or more processors of a computing device, such as computing device 10 illustrated in FIG. 1 and FIG. 2. For purposes of illustration, FIG. 4 is described below within the context of computing devices 10 of FIG. 1 and FIG. 2.

Notification module 16, operable by processors 40, may receive an instruction from an application module 18 to generate a notification (92). Along with the instruction, notification module 16 may receive from the application module 18 notification information associated with the notification to be generated. For example, for a notification related to a received communication, the notification information may include a sender of the communication, a subject of the communication, and/or at least a portion of the body of the communication.

In response to receiving the instruction (92), notification module 16 generates a notification object (94). The notification object may be a placeholder for the eventual notification.

Notification module 16 then assigns the notification object to at least one notification class from a plurality of notification classes (96). As described above, in some examples, the notification object and the contextual notification need not be different, e.g., notification module 16 can generate the contextual notification, populate the contextual information with notification information, and the assign the contextual notification (the notification object) to at least notification class from the plurality of notification classes (96).

As described above, notification module 16 may base the assignment of the notification object on the notification information received from the application module 18. Additionally, in some instances, notification module 16 may analyze contextual information in combination with the notification information when determining to which notification class(es) to assign the notification object. Contextual information can include, for example, information associated with an application module operable by one or more processors of the computing device, information associated with a user of the computing device, or information associated with at least one sensor of the computing device. More specific examples of contextual information include, for example, of information associated with an application module operable by one or more processors of the computing device, information associated with a user of the computing device, or information associated with at least one sensor of the computing device comprises at least one of a geolocation of the mobile computing device, a history of search results associated with a user of the mobile computing device, a history of search results associated with an application executed by the one or more processors, information associated with the user and at least one application executed by the one or more processors, information from a social network profile associated with the user of the device, contents of at least one communication directed to the user of the device and received by the mobile computing device or a server with which the mobile computing device is configured to communicate, information associated with at least one sensor of the computing device, or historical use patterns of the device by the user.

The plurality of notification classes can include any number (e.g., at least two) of notification classes. The notification classes may be defined based on one or more classifiers, such as, for example, urgent/non-urgent, requested by user/unrequested, or related to a task that the user is performing using computing device 10/not related to the task. Example notification classes include a supportive notification class, a demanded notification class, an interruptive notification class, and an opportunistic notification class.

After notification module 16 has assigned the notification object to the at least one notification class (96), notification module 16 may generate the contextual notification based at least in part on the notification class(es) to which notification module assigned the notification object (98). Notification module 16 may generate the contextual notification by populating the notification object with at least some of the notification information received from the application module 18.

Notification module 16 then can output the contextual notification in a manner based at least in part on the at least one notification class (99). As described above, notification module 16 can output the contextual notification as a visual contextual notification at presence-sensitive display 13, as an audible notification, e.g., at a speaker, or as a tactile notification, e.g., at an eccentric motor. Also described above, the user interface context in which notification module 16 causes the contextual notification to be displayed at presence-sensitive display 13 may depend at least in part on the notification class to which the contextual notification is assigned.

Figure 5:
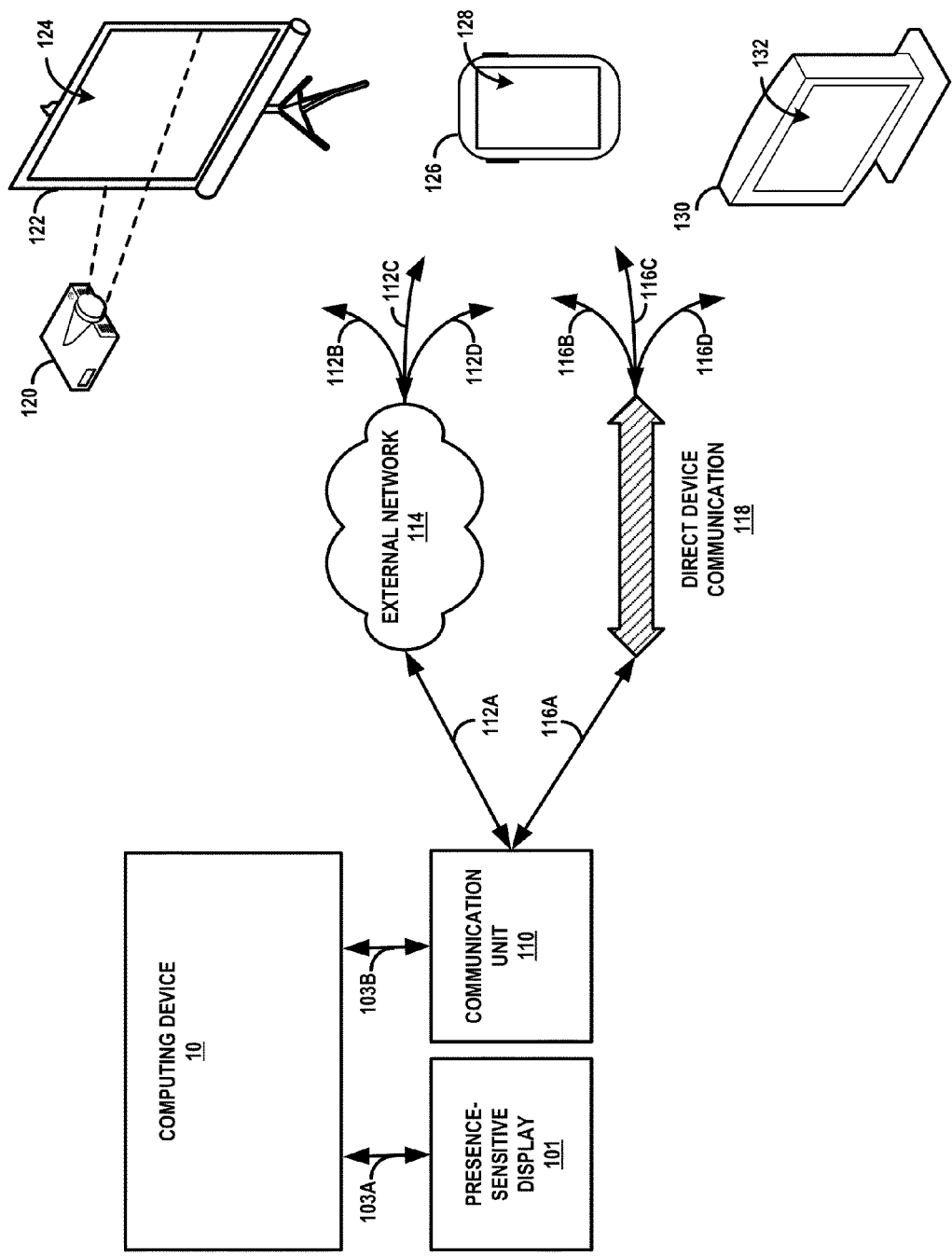
FIG. 5 is a block diagram illustrating an example computing device that outputs graphical content for display at a remote device, in accordance with one or more techniques of the present disclosure.

FIG. 5 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 5 includes a computing device 10, presence-sensitive display 101, communication unit 110, projector 120, projector screen 122, tablet device 126, and visual display device 130. Although shown for purposes of example in FIGS. 1 and 2 as a stand-alone computing device 10, a computing-device may, generally, be any component or system that includes a processor or other suitable computing environment for executing software instructions and, for example, need not include a presence-sensitive display.

As shown in the example of FIG. 5, computing device 10 may be a processor that includes functionality as described with respect to processors 40 in FIG. 2. In such examples, computing device 10 may be operatively coupled to presence-sensitive display 101 by a communication channel 103A, which may be a system bus or other suitable connection. Computing device 10 may also be operatively coupled to I/O devices 110, further described below, by a communication channel 103B, which may also be a system bus or other suitable connection. Although shown separately as an example in FIG. 5, computing device 10 may be operatively coupled to presence-sensitive display 101 and I/O devices 110 by any number of one or more communication channels.

In other examples, such as illustrated previously in FIGS. 1-2, computing device 10 may be a portable or mobile device such as mobile phones (including smart phones), laptop computers, etc. In some examples, computing device 10 may be a desktop computers, tablet computers, smart television platforms, cameras, personal digital assistants (PDAs), servers, mainframes, etc.

As shown in FIG. 5, computing device 10 may also include and/or be operatively coupled with communication unit 110. Communication unit 110 may include functionality of communication units 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 10 may also include and/or be operatively coupled with one or more other devices, e.g., input devices, output devices, memory, storage devices, etc. that are not shown in FIG. 5 for purposes of brevity and illustration.

FIG. 5 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 10. In some examples, the one or more communication units may enable communication between projector 120 and projector screen 122. Projector 120 may receive data from computing device 10 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 10.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 10 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 10.

FIG. 5 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 5, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 10 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 10.

As described above, in some examples, computing device 10 may output graphical content for display at presence-sensitive display 101 that is coupled to computing device 10 by a system bus or other suitable communication channel. Computing device 10 may also output graphical content for display at one or more remote devices, such as projector 120, projector screen 122, tablet device 126, and visual display device 130. For instance, computing device 10 may execute one or more instructions to generate and/or modify graphical content in accordance with techniques of the present disclosure. Computing device 10 may output the data that includes the graphical content to a communication unit of computing device 10, such as communication unit 110. Communication unit 110 may send the data to one or more of the remote devices, such as projector 120, projector screen 122, tablet device 126, and/or visual display device 130. In this way, processor 102 may output the graphical content for display at one or more of the remote devices. In some examples, one or more of the remote devices may output the graphical content at a presence-sensitive display that is included in and/or operatively coupled to the respective remote devices.

In some examples, computing device 10 may not output graphical content at presence-sensitive display 101 that is operatively coupled to computing device 10. In other examples, computing device 10 may output graphical content for display at both a presence-sensitive display 101 that is coupled to computing device 10 by communication channel 103A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 10 and output for display at presence-sensitive display 101 may be different than graphical content display output for display at one or more remote devices.

Computing device 10 may send and receive data using any suitable communication techniques. For example, computing device 10 may be operatively coupled to external network 114 using network link 112A. Each of the remote devices illustrated in FIG. 5 may be operatively coupled to network external network 114 by one of respective network links 112B, 112C, and 112D. External network 114 may include network hubs, network switches, network routers, etc., that are operatively inter-coupled thereby providing for the exchange of information between computing device 10 and the remote devices illustrated in FIG. 5. In some examples, network links 112A-112D may be Ethernet, ATM or other network connections. Such connections may be wireless and/or wired connections.

In some examples, computing device 10 may be operatively coupled to one or more of the remote devices included in FIG. 5 using direct device communication 118. Direct device communication 118 may include communications through which computing device 10 sends and receives data directly with a remote device, using wired or wireless communication. That is, in some examples of direct device communication 118, data sent by computing device 10 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in FIG. 5 may be operatively coupled with computing device 10 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 10 may be operatively coupled to visual display device 130 using external network 114. Computing device 10 may receive an instruction from an application module (e.g., one of application modules 18 shown in FIGS. 1 and 2) to generate a notification. Along with the instruction, computing device 10 may receive from the application module notification information associated with the notification to be generated. For example, for a notification related to a received communication, the notification information may include a sender of the communication, a subject of the communication, and/or at least a portion of the body of the communication.

In response to receiving the instruction, computing device 10 may generate a notification object, which may be a placeholder for the eventual notification.

Computing device 10 then assigns the notification object to at least one notification class from a plurality of notification classes. As described above, computing device 10 may base the assignment of the notification object on the notification information received from the application module. Additionally, in some instances, computing device 10 may analyze contextual information in combination with the notification information when determining to which notification class(es) to assign the notification object.

The plurality of notification classes can include any number (e.g., at least two) of notification classes. The notification classes may be defined based on one or more classifiers, such as, for example, urgent/non-urgent, requested by user/unrequested, or related to a task that the user is performing using computing device 10/not related to the task. Example notification classes include a supportive notification class, a demanded notification class, an interruptive notification class, and an opportunistic notification class.

After computing device 10 has assigned the notification object to the at least one notification class, computing device 10 may generate the contextual notification based at least in part on the notification class(es) to which computing device 10 assigned the notification object. Computing device 10 may generate the contextual notification by populating the notification object with at least some of the notification information received from the application module.

Computing device 10 then can output the contextual notification in a manner based at least in part on the at least one notification class. As described above, computing device 10 can output the contextual notification as a visual contextual notification, for example, to a communication unit of computing device 10, such as communication unit 110. Communication unit 110 may send the data to one or more of the remote devices, such as projector 120, tablet device 126, and/or visual display device 130. In this way, processor 102 may output the visual contextual notification for display at one or more of the remote devices. In other examples, computing device 10 may output the contextual notification as an audible notification, e.g., at a speaker, or as a tactile notification, e.g., at an eccentric motor. Also described above, the user interface context in which computing device 10 causes the contextual notification to be displayed at the remote device may depend at least in part on the notification class to which the contextual notification is assigned.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    receiving, by a notification module operable by a computing device, an instruction to generate a contextual notification based at least in part on notification information associated with the instruction;
    generating, by the notification module, in response to receiving the instruction, a notification object;
    assigning, by the notification module, based at least in part on the notification information, the notification object to at least one notification class from a plurality of notification classes,
        wherein a first notification class from the plurality of notification classes is associated with non-urgent, unrequested notifications related to a current task that the computing device is performing,
        wherein a second notification class from the plurality of notification classes is associated with urgent, unrequested notifications,
        wherein a third notification class from the plurality of notification classes is associated with non-urgent, requested notifications related to the current task, and
        wherein a fourth notification class from the plurality of notification classes is associated with non-urgent, unrequested notifications not related to the current task;
    generating, by the notification module, based at least in part on the at least one notification class to which the notification object is assigned, the contextual notification by populating the notification object with the notification information; and
    outputting the contextual notification in a manner determined based at least in part on the at least one notification class.

2. The method of claim 1, wherein assigning the notification object to the at least one notification class from the plurality of notification classes comprises assigning, based at least in part on the notification information and contextual information, the notification object to the at least one notification class from a plurality of notification classes.

3. The method of claim 2, wherein the contextual information comprises at least one of information associated with an application module operable by one or more processors of the computing device, information associated with a user of the computing device, and information associated with at least one sensor of the computing device.

4. The method of claim 3, wherein the at least one of information associated with an application module operable by one or more processors of the computing device, information associated with a user of the computing device, and information associated with at least one sensor of the computing device comprises at least one of: a geolocation of the mobile computing device, a history of search results associated with a user of the mobile computing device, a history of search results associated with an application executed by the one or more processors, information associated with the user and at least one application executed by the one or more processors, information from a social network profile associated with the user of the device, contents of at least one communication directed to the user of the device and received by the mobile computing device or a server with which the mobile computing device is configured to communicate, information associated with at least one sensor of the computing device, and historical use patterns of the device by the user.

5. The method of claim 2, further comprising, after outputting the contextual notification in the manner determined based at least in part on the at least one notification class, reassigning, based at least in part on the notification information and current contextual information, the notification object to a different notification class than the at least one notification class to which the notification object was previously assigned.

6. The method of claim 2, further comprising, after outputting the contextual notification in the manner determined based at least in part on the at least one notification class, dismissing, based at least in part on the notification information and current contextual information, the notification object.

7. The method of claim 1, wherein outputting the contextual notification in the manner determined based at least in part on the at least one notification class comprises outputting, for display, a visual contextual notification.

8. The method of claim 1, wherein outputting the contextual notification in the manner determined based at least in part on the at least one notification class comprises outputting an audible contextual notification.

9. The method of claim 1, wherein outputting the contextual notification in the manner determined based at least in part on the at least one notification class comprises outputting a tactile contextual notification.

10. The method of claim 1, wherein assigning the notification object to the at least one notification class from the plurality of notification classes comprises assigning the notification object to the first notification class, and wherein outputting the contextual notification in the manner determined based at least in part on the at least one notification class comprises outputting, for display, a visual contextual notification in a user interface region adjacent to a current user interface such that the contextual notification is integrated with the current user interface.

11. The method of claim 1, wherein assigning the notification object to the at least one notification class from the plurality of notification classes comprises assigning the notification object to the second notification class, and wherein outputting the contextual notification in the manner determined based at least in part on the at least one notification class comprises outputting, for display, a visual contextual notification in a user interface region adjacent to a current user interface such that the contextual notification is clearly differentiated from the current user interface.

12. The method of claim 1, wherein assigning the notification object to the at least one notification class from the plurality of notification classes comprises assigning the notification object to the third notification class, and wherein outputting the contextual notification in the manner determined based at least in part on the at least one notification class comprises outputting, for display, a visual contextual notification in a current user interface.

13. The method of claim 1, wherein assigning the notification object to the at least one notification class from the plurality of notification classes comprises assigning the notification object to the fourth notification class, and wherein outputting the contextual notification in the manner determined based at least in part on the at least one notification class comprises outputting, for display, a visual contextual notification in a task-switching user interface space that is displayed when the user is switching tasks performed by the computing device.

14. The method of claim 13, wherein the task-switching user interface comprises at least one of a lock screen user interface, a notification shade user interface, and a home screen user interface.

15. A computing device comprising:
one or more processors; and
a notification module operable by the one or more processors and configured to:
receive an instruction to generate a contextual notification based at least in part on notification information associated with the instruction;
generate, in response to receiving the instruction, a notification object;
assign, based at least in part on the notification information and contextual information associated with at least one of the computing device, a user of the computing device, or a sensor operably coupled to the computing device, the notification object to at least one notification class from a plurality of notification classes,
wherein a first notification class from the plurality of notification classes is associated with non-urgent, unrequested notifications related to a current task that the computing device is performing,
wherein a second notification class from the plurality of notification classes is associated with urgent, unrequested notifications,
wherein a third notification class from the plurality of notification classes is associated with non-urgent, requested notifications related to the current task, and
wherein a fourth notification class from the plurality of notification classes is associated with non-urgent, unrequested notifications not related to the current task;
generate, based at least in part on the at least one notification class to which the notification object is assigned, the contextual notification by populating the notification object with the notification information; and
output the contextual notification in a manner determined based at least in part on the at least one notification class.

16. The computing device of claim 15, wherein contextual information associated with at least one of the computing device, the user of the computing device, or at least one sensor operably coupled to the computing device comprises at least one of a geolocation of the mobile computing device, a history of search results associated with a user of the mobile computing device, a history of search results associated with an application executed by the one or more processors, information associated with the user and at least one application executed by the one or more processors, information from a social network profile associated with the user of the device, contents of at least one communication directed to the user of the device and received by the mobile computing device or a server with which the mobile computing device is configured to communicate, information associated with at least one sensor of the computing device, and historical use patterns of the device by the user.

17. The computing device of claim 15, further comprising a display device, wherein outputting the contextual notification in a manner determined based at least in part on the at least one notification class comprises outputting a visual contextual notification for display at the display device.

18. A computer-readable storage medium comprising instructions that, when executed, configure one or more processors of a computing device to:
   receive an instruction to generate a contextual notification based at least in part on notification information associated with the instruction;
   generate, in response to receiving the instruction, a notification object;
   assign, based at least in part on the notification information and at least one of information associated with an application module operable by one or more processors of the computing device, information associated with a user of the computing device, or information associated with at least one sensor of the computing device, the notification object to at least one notification class from a plurality of notification classes,
      wherein a first notification class from the plurality of notification classes comprises non-urgent, unrequested notifications related to a current task that the computing device is performing,
      wherein a second notification class from the plurality of notification classes comprises urgent, unrequested notifications,
      wherein a third notification class from the plurality of notification classes comprises non-urgent, requested notifications related to the current task, and
      wherein a fourth notification class from the plurality of notification classes comprises non-urgent, unrequested notifications that are not related to the current task;
   generate, based at least in part on the at least one notification class to which the notification object is assigned, the contextual notification by populating the notification object with the notification information; and
   output the contextual notification in a manner determined based at least in part on the at least one notification class.

19. The computer-readable storage medium of claim 18, wherein contextual information associated with at least one of the computing device, the user of the computing device, or at least one sensor operably coupled to the computing device comprises at least one of: a geolocation of the mobile computing device, a history of search results associated with a user of the mobile computing device, a history of search results associated with an application executed by the one or more processors, information associated with the user and at least one application executed by the one or more processors, information from a social network profile associated with the user of the device, contents of at least one communication directed to the user of the device and received by the mobile computing device or a server with which the mobile computing device is configured to communicate, information associated with at least one sensor of the computing device, and historical use patterns of the device by the user.

20. The computer-readable storage medium of claim 18, further comprising instructions that, when executed, configure the one or more processors to output a visual contextual notification for display at a display device.

* * * * *